United States Patent [19]

Rayner

[11] Patent Number: 4,823,839
[45] Date of Patent: Apr. 25, 1989

[54] ROTARY VALVE ASSEMBLY AND A METHOD OF ASSEMBLING A ROTARY VALVE

[75] Inventor: Alan Rayner, Yatton, Great Britain

[73] Assignee: TRW Cam Gears Limited, Clevedon, Great Britain

[21] Appl. No.: 37,808

[22] Filed: Apr. 13, 1987

[30] Foreign Application Priority Data

Apr. 14, 1986 [GB] United Kingdom .................. 8609018

[51] Int. Cl.$^4$ ............................................. F15B 13/04
[52] U.S. Cl. ............................ 137/625.24; 91/375 A; 180/148
[58] Field of Search ................ 91/375 A; 137/625.24; 180/148

[56] References Cited

U.S. PATENT DOCUMENTS

| | | | |
|---|---|---|---|
| 3,145,626 | 8/1964 | Vickers et al. | 137/625.24 X |
| 3,296,939 | 1/1967 | Eddy | 137/625.24 X |
| 4,177,714 | 12/1979 | Schluckebier | 91/375 A |
| 4,449,601 | 5/1984 | Adams | 137/625.24 X |
| 4,487,225 | 12/1984 | Adams | 91/375 A X |
| 4,699,174 | 10/1987 | Bishop | 137/625.24 |

FOREIGN PATENT DOCUMENTS 1603198 11/1981 United Kingdom ............ 91/375 A

Primary Examiner—Gerald A. Michalsky
Attorney, Agent, or Firm—Tarolli, Sundheim & Covell

[57] ABSTRACT

A rotary valve assembly and a method of assembling such a valve has a sleeve 5 and a rotor 3 relative rotation between which from a neutral condition adjusts the valve. The sleeve and rotor are biased to the neutral condition by an encircling C-spring reacting on pins corresponding to projections 11a and 12 relatively rotatable with the sleeve 5 and rotor 3 respectively. For setting-up the valve in its neutral condition the sleeve and rotor are mounted in a jig 15 with the projection 11a of the jig engaging in a recess 27 of an adjustable component in the form of a second C-spring 24 which is intitially rotatable on the sleeve 5. The sleeve 5 is rotated relative to the spring 24 and projections 11a and 12 to determine the neutral condition by the characteristics of fluid applied through valve ports E, S, $P_1$, $P_2$. The spring 24 is now welded or otherwise secured to the sleeve 5. The spring 24 serves to frictionally engage the sleeve and alleviates displacement relative thereto following adjacent of the valve to the neutral condition and prior to welding. In a second embodiment the projection 11a directly engages the sleeve 5 to restrain relative rotation therebetween and the pin 12 is carried by a C-spring to be rotationally adjustable on the rotor 3 for the purpose of setting-up the valve in its neutral condition prior to the pin 12 being welded to the rotor 3.

16 Claims, 5 Drawing Sheets

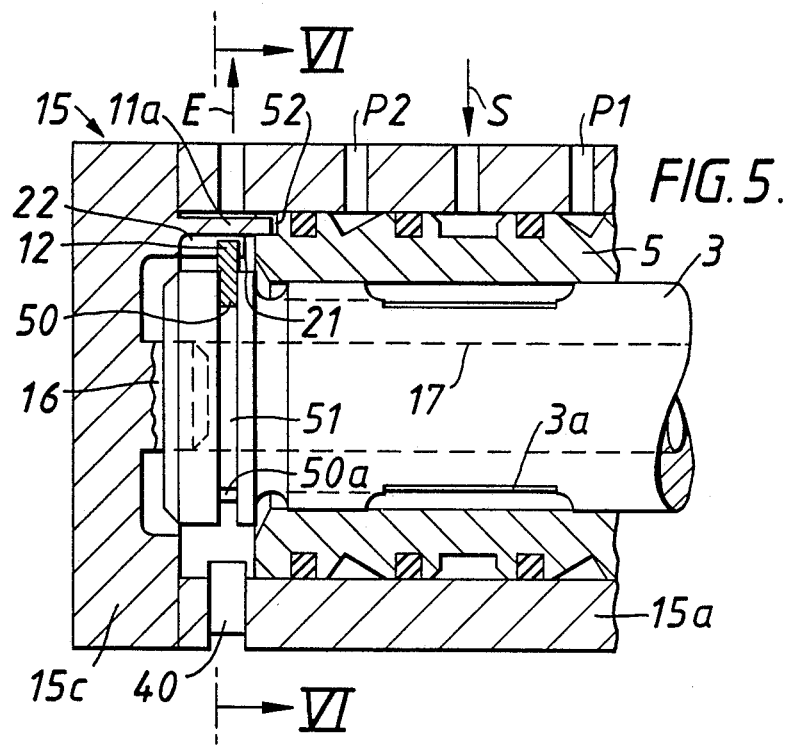
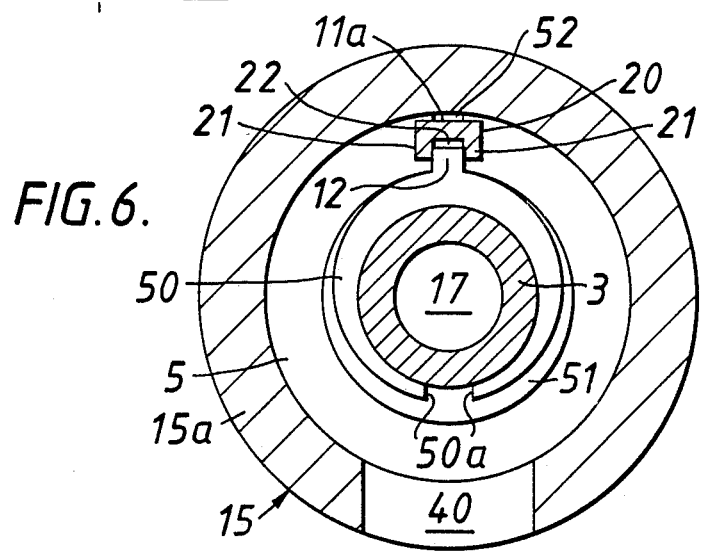

ROTARY VALVE ASSEMBLY AND A METHOD OF ASSEMBLING A ROTARY VALVE

TECHNICAL FIELD AND BACKGROUND ART

The present invention relates to a rotary valve assembly and a method of assembling a rotary valve. More particularly the invention concerns a rotary valve of the type having a sleeve member, a rotor member within the sleeve member and relative rotation between which members about an axis and from a neutral condition causes an adjustment in the valve, C-spring means circumferentially biasing the sleeve member relative to the rotor member and the assembly to said neutral condition, the C-spring means being located around the axis and having a mouth within which is located a first abutment secured relative to the rotor member and a second abutment secured relative to the sleeve member, the abutments reacting against the C-spring means in the mouth thereof to enlarge the mouth during relative rotation between the rotor and sleeve members to effect the said biasing—such a rotary valve will hereinafter be referred to as "of the type specified".

Rotary valves of the type specified are frequently employed in power assisted vehicle steering gears where relative rotation between the rotor and sleeve members in response to a steering input torque and from the neutral condition adjusts the valve to control the power assistance which is provided. The biasing of the C-spring means, either independently or in combination with other spring biasing such as a torsion rod as is well known in rotary valves, causes the rotary valve to revert to its neutral condition upon removal of the input torque; an example of a rotary valve of the type specified is to be found in the assignee's British Patent Specification No. 1,603,198.

For efficient operation of a rotary valve of the type specified it is desirable that the valve is correctly set-up (sometimes referred to as "balanced") when in its neutral condition, that is to say that the spring biasing means which reacts between the rotor and sleeve members should bias those members rotationally relative to each other and to the neutral condition in which condition fluid flow, if any, through the valve should present predetermined, balanced, characteristics. A typical rotary valve of the type specified for a power assisted vehicle steering gear will provide open centre, open return characteristics in its neutral condition and in this condition a supply of fluid under pressure to a common inlet port of the valve should provide pressure drops which are balanced over outlet ports of the valve these ports corresponding to connections on the valve, for example, to opposite sides of a power assistance ram and to a fluid exhaust or return. A rotary valve which does not provide balanced characteristics in a neutral condition as aforementioned is undesirable as it will be appreciated that, particularly in a power assisted steering gear, the use of such a valve can adversely affect the characteristics of the steering gear to an unacceptable extent.

It is an object of the present invention to provide a rotary valve of the type specified and a method of assembling such a valve by which the characteristics thereof in a neutral condition can be determined to alleviate the disadvantages discussed above.

STATEMENTS OF INVENTION AND ADVANTAGES

According to the present invention there is provided a rotary valve assembly of the type specified in which the location of the circumferential position of at least one of the abutments relative to its respective sleeve or rotor member is initially adjustable for positioning the rotor member circumferentially relative to the sleeve member and determining the circumferential orientation between the rotor and sleeve members in the neutral condition and means being provided for securing the so-adjusted circumferential position of the location relative to its respective sleeve or rotor member.

Further according to the present invention there is provided a method of assembling a rotary valve of the type specified to determine the characteristics thereof in its neutral condition and which comprises adjusting the location of the circumferential position of at least one of said abutments relative to its respective sleeve or rotor member and positioning the rotor member circumferentially relative to the sleeve member to provide the desired neutral condition of the valve and securing the so adjusted circumferential position of the location relative to its respective sleeve or rotor member.

Still further according to the present invention there is provided a rotary valve of the type specified and assembled by the method set forth in the immediately preceding paragraph.

By the present invention it is envisaged that the rotor and sleeve members of the rotary valve will initially be assembled so that the abutments of those members will initially be located for engagement with the C-spring biasing and this initial location of the two abutments will determine a neutral condition of the valve. Following this initial assembly the valve can be tested by subjecting it to fluid under pressure (conveniently from an air pressure line although usually the rotary valve will be used in practice for controlling hydraulic fluid) and pressure readings taken over various ports of the valve to assess whether the valve is in a preferred neutral condition or otherwise. Where it is found that the valve is out of balance, one or other (or possibly both) of the locations for the abutments is displaced circumferentially relative to its respective rotor or sleeve member (to which that location or abutment will eventually be secured) so that, in effect, the sleeve is rotated partially relative to the rotor until a balanced or the predetermined neutral condition for the valve is achieved. In this latter condition the respective one or both of the abutments or the locations for those abutments is secured in position relative to its respective rotor or sleeve members. This initial adjustment of the rotor and sleeve members and effective positioning of the abutments (or the location for those abutments or the respective members) and the fluid pressure testing of the valve to determine the neutral condition is conveniently achieved in a jig. The jig will generally correspond to a housing in which the valve will be accommodated in practice but may have the facility to provide convenient access for the purpose of adjusting the location of the circumferential position of the abutment relative to its respective sleeve or rotor member as aforementioned.

One or other or both of the sleeve and rotor members can carry an adjustment component which component itself carries, or is intended to engage with, the abutment which is to be circumferentially displaceable in unison with the respective sleeve member or rotor member. Initially the adjustment component can be circumferentially adjustable relative to its respective sleeve member or rotor member for the purpose of positioning the circumferential location of the abutment relative to the sleeve or rotor member with which that abutment is to be circumferentially displaceable as a unit; ultimately (that is following the determination of the preferred neutral condition) the adjustment component can be fixedly secured relative to its sleeve or rotor member for rotation in unison with that member. Following the initial adjustment of the adjustment component to a position in which the valve demonstrates the desired characteristics in its neutral condition, the adjustment component is conveniently fixedly secured relative to its respective sleeve or rotor member by a simple locking screw, rivet or a simple welding, bonding or adhesive techniques. The adjustment component is conveniently in the form of a second C-spring means which extends around the axis of the valve assembly and is spring biased into frictional engagement with its respective sleeve or rotor member but can be displaced against its biasing to permit circumferential displacement between itself and its member as the rotary valve is being set up to provide the predetermined characteristics in the neutral condition. The spring biasing of the second C-spring means into frictional engagement with the respective rotor or sleeve member with which it is ultimately intended to be secured provides a convenient means by which it may be ensured that the adjustment component is temporarily held in position on its respective member following adjustment of the valve to the desired neutral condition and until such time as the adjustment component can be fixedly secured to its member, for example by adhesive or welding as aforementioned.

By a further proposal the adjustment component is in the form of an eccentric pin or similar eccentric element which may serve as the first or the second abutment on the respective rotor or sleeve members and which can be rotationally adjusted on the member which carries it (and to which it is ultimately intended to be secured) so that an eccentric part of the pin is effectively displaced circumferentially as appropriate for adjusting the valve to its desired neutral condition.

Generally the first abutment which is secured for rotation with the rotor member will comprise a radial projection on the rotor member while the second abutment secured for rotation with the sleeve member will comprise an axial projection; with such an arrangement it is preferred that the radial projection is rigid with the rotor for circumferential displacement therewith and that the second abutment (or the position for the location of that abutment) is initially circumferentially adjustable relative to the sleeve member.

DRAWINGS

Embodiments of a rotary valve assembly of the type specified and constructed in accordance with the present invention will now be described, by way of example only, with reference to the accompanying illustrative drawings in which:

FIG. 5 is an axial section of rotor and sleeve members for a second embodiment of the rotary valve assembled in a jig similar to that shown in FIG. 2 but with an adjustment component on the rotor member for the purpose of determining and adjusting the characteristic of the valve in its neutral condition;

FIG. 6 is a section of the jig and rotary valve assembly shown in FIG. 5 taken on the line VI—VI of that Figure;

DETAILED DESCRIPTION WITH REFERENCE TO DRAWINGS

Figure 1:
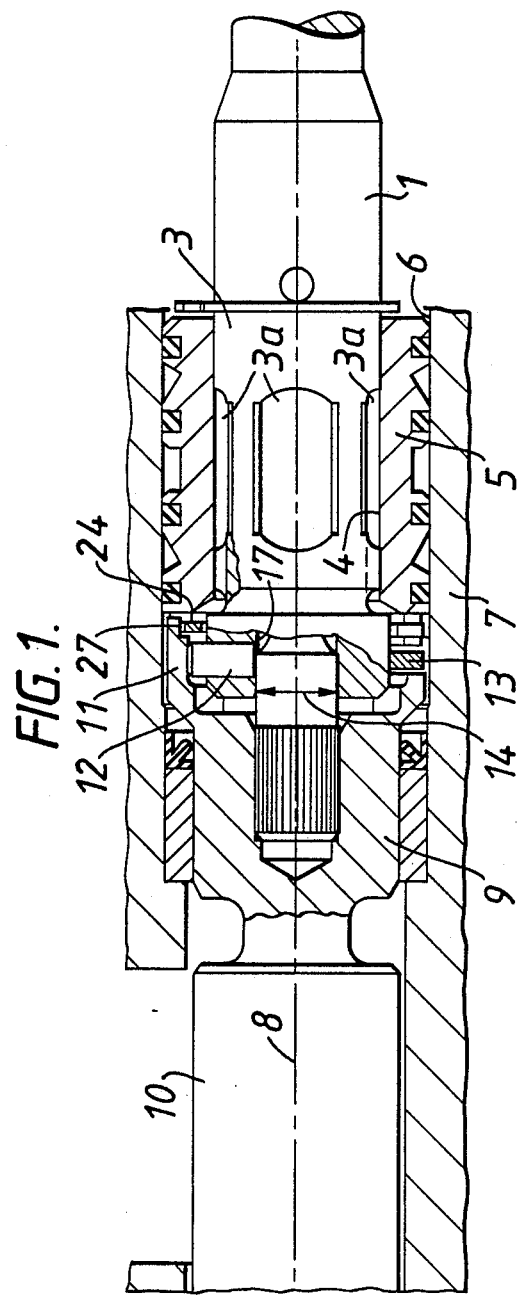
FIG. 1 is an axial section through part of a rack and pinion power assisted steering gear which incorporates one embodiment of the rotary valve.

The rack and pinion power assisted steering gear of which the arrangement shown in FIG. 1 forms part may be considered to operate generally in accordance with conventional practice and has a steering input shaft 1 an inner end of which forms a rotor 3. The rotor 3 is received in a cylinder 4 of a valve sleeve 5 which latter is received in a cylinder 6 of a housing 7. The sleeve 5 is rotatably mounted in the cylinder 6 and is coupled to rotate in unison about axis 8 with a shaft 9 of a pinion 10 driving a rack bar (not shown) in conventional manner to effect a steering manoevre. The coupling between the pinion shaft 9 and the valve sleeve 5 is provided by an axially projecting spigot 11 engaging axially in a complementary sized recess 27 carried by the adjacent end of the sleeve 5. Projecting radially from the rotor 3 and in radial alignment with the projection 11 is a pin 12 secured for rotation with the rotor. Mounted on and extending around the rotor 3 in the radial plane of the pin 12 is a C-spring 13 having a mouth (not shown) within which is located the projection 11 and the pin 12 so that the mouth radially overlies and circumferentially opposed sides thereof abut both of these projections. The purpose served by the C-spring 13 is similar to that discussed in the assignee's British Patent Specification No. 1,603,198. It will be appreciated that during relative rotation between the rotor 3 and sleeve 5 (and thereby between the pin 12 and projection 11) about the axis 8 in one or opposite directions of rotation in response to a steering input torque, the abutment of the pin 12 and projection 11 with the opposite sides of the mouth of the C-spring 13 will cause that mouth to enlarge circumferentially. The C-spring is thereby energized and this acts to bias the pin 12 and projection 11 into their positions in radial alignment with each other; these latter positions correspond to the rotor 3 and sleeve 5 being in a neutral condition of the rotary valve formed by these members. In the present example a conventional form of torsion bar 14 is shown housed in a central bore 17 of the rotor to couple the pinion shaft 9 to the input shaft 1 and additionally serve to bias the rotor and sleeve to the neutral condition in conventional manner; however for the purpose of an understanding of the present invention, the presence of the torsion bar 14 can be disregarded.

In its use in a power assisted vehicle steering gear, the rotary valve formed by the rotor 3 and sleeve 5 will usually be of the closed centre or open centre type, more commonly the open centre type of valve is employed with an open centre return in its neutral condition. When in its neutral condition, it is desirable that the rotary valve is balanced with regard to the source of fluid under pressure which is applied to it so that the pressure differential between that source and outlets of the valve (say to opposite sides of a power assistance ram) are symmetrical; to achieve this it will be apparent that the position of the ports 3a in the rotor 3 must be accurately located circumferentially with respect to the ports (not shown) in the sleeve 5 with which they are to effect control of the fluid passing through the valve. This accurate location between the respective control ports must be determined bearing in mind the relative positions of the pin 12 and projection 11. An arrangement for achieving a required balancing of the rotary valve comprising the members 3 and 5 in a neutral condition will now be described with reference to FIGS. 2 to 4.

Prior to incorporating the rotor 3 and its sleeve 5 in the steering gear shown in FIG. 1, these members are mounted in a jig 15 (which effectively substitutes for the housing 7) which comprises a cylindrical wall 15a within which the sleeve 5 is closely received, an end wall 15b secured to wall 15a and through an aperture in which the input shaft 1 extends, and an end cap 15c. The end cap 15c has a spigot 16 which co-operates co-axially with the bore 17 in the rotor 3 so that the end cap 15c can rotate about the spigot 16 and relative to the rotor 3 and the cylinder wall 15a. The sleeve 5 is restrained from rotation relative to the walls 15a and 15b by pins 18. In effect, the end cap 15c serves as a substitute for the pinion shaft 9 in FIG. 1. This cap has an axially extending projection 11a (which is intended to correspond to the projection 11 in FIG. 1) and couples the end cap 15c to the recess 27 in the end of the sleeve 5 so that the end cap 15c and sleeve 5 can rotate in unison about the axis 8. The projection 11a is formed as part of a bracket 20 (see FIG. 2A) on the end cap 15c. The bracket 20 has opposed side walls 21 which form a recess 22 radially inwardly of and in radial alignment with the projection 11a. On fitting the end cap 15c as part of the jig, the radial pin 12 of the rotor 3 is axially received in the recess 22 as a close sliding fit between the walls 21 so that the end cap 15c and rotor 3 will rotate in unison about the axis 8.

Figure 3:
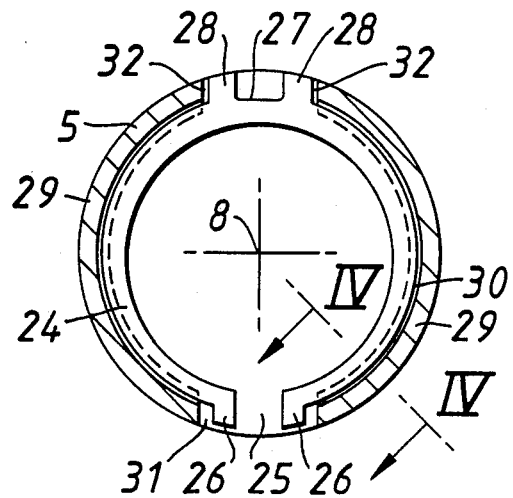
FIG. 3 is an end view of the sleeve member of the valve along the line III—III of FIG. 2 and illustrates an adjustment component on that member.
Figure 4:
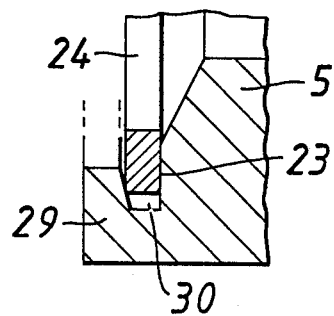
FIG. 4 shows a section along the line IV—IV of FIG. 3.

Mounted on the end face 23 of the sleeve 5 adjacent to the end cap 15c is an adjustment component in the form of a second C-spring 24 (best shown in FIGS. 3 and 4). The spring 24 has a mouth 25 formed by ears 26. Circumferentially spaced from the mouth 25, conveniently diametrically opposite thereto, is the recess 27 which is formed by circumferentially spaced and radially outwardly extending bosses 28 on the C-spring The spring 24 is mounted on the end face 23 of the valve sleeve 5 within an axially extending cylindrical skirt 29 of the sleeve and so that the radially outer marginal edge part of the spring 24 is seated within an internal recess 30 of the skirt 29. The spring 24 is resiliently biased in a sense to circumferentially enlarge its mouth 25 so that its aforementioned marginal edge part is urged into engagement with the recess 30 as shown in FIG. 4. Preferably the axially opposed side faces of the recess 30 converge as the depth of the recess increases (as shown in FIG. 4) so that the biasing of the spring 24 urges the edge of that spring as a wedge fit into the recess 30. To permit the spring 24 to engage in the recess 30, clearance is provided in the skirt 29 to accommodate the ears 26 and the outer peripheral part of the spring between the bosses 28; more particularly the skirt 29 is shown in FIG. 3 cut-away at 31 to accommodate the ears 26 and cut-away at 32 to accommodate the bosses 28. With the spring 24 mounted on the end face 23 of the sleeve 5 as aforementioned, the natural resilience of the spring urging it into frictional engagement with the recess 30 in the valve sleeve will normally, and to a limited extent, retain the C-spring against rotation about the axis 8 relative to the valve sleeve 5. By closing the mouth 25 of the C-spring (by nipping together the ears 26 with an appropriate tool) it will be apparent that the diameter of the C-spring is effectively reduced; the retaining pressure between the C-spring and the recess 30 can thereby be relieved to an extent that the C-spring 24 may, as determined by the circumferential clearance of the cut-away region 31 or 32, be partially rotated about the axis 8 relative to the valve sleeve 5.

Figure 2:
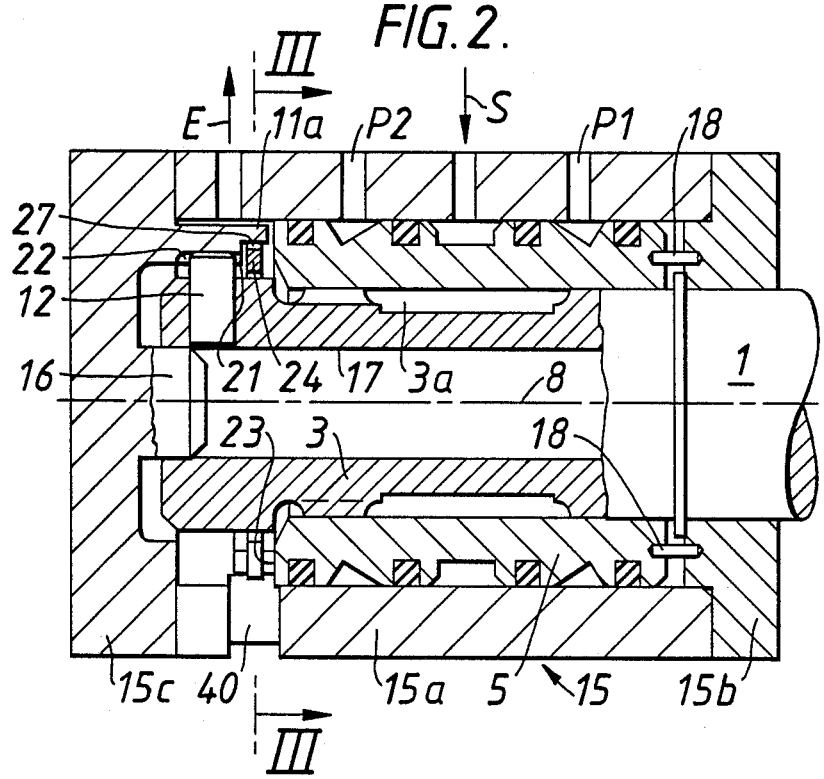
FIG. 2 is an axial section of the rotor and sleeve members incorporated in the valve in FIG. 1 and which members are assembled in a jig for the purpose of determining and adjusting the characteristic of the valve in its neutral condition.
Figure 2A:
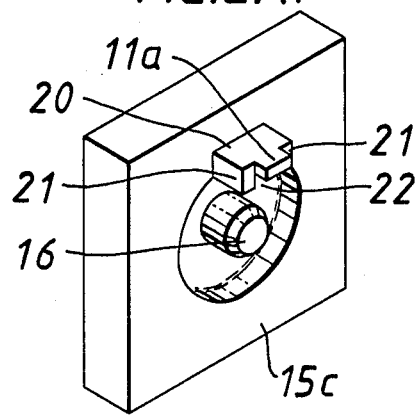
FIG. 2A is a perspective view of an end cap of the jig shown in FIG. 2.

The recess 27 in the second C-spring 24 is located on the end face of the valve sleeve 5 in axial alignment with the projection 11a of the end cap and this recess 27 axially receives the projection 11a as a reasonably close sliding fit as shown in FIG. 2. Consequently, with the spring 24 frictionally secured to the sleeve 5 (by the natural biasing of the spring 24 into engagement with the recess 30), the spring 24 may be considered as rotating in unison with the sleeve 5; from this it follows that the coupling of the end cap 15c (through the projection 11a and recess 27) with the valve sleeve 5 can cause the valve sleeve and end cap 15c to rotate in unison and that the end cap and valve sleeve could be rotated by rotation of the shaft 1 through the rotor 3 and radially extending pin 12.

In practice the cut-away parts 31 and 32 (particularly 32) in the skirt 29 of the valve sleeve will be positioned on that sleeve and with respect to the central ports in the sleeve (which ports co-operate with the ports 3a on the rotor to effect control of the fluid) so that when the sleeve and rotor are fitted into the jig as shown in FIG. 2, the circumferential orientation between the rotor and sleeve as determined by the engagement of the radial pin 12 in the recess 22 and the engagement of the axial projection 11a in the recess 27, will approximate to the valve being in its intended neutral condition.

With the valve sleeve and rotor fitted in the jig 15 as described above, the characteristics of the rotary valve in its neutral condition and as they will occur in practice can be simulated in the jig 15 by the provision, in the cylinder wall 15a as shown in FIG. 2, of a common fluid pressure port S, ports P1 and P2 (which may be intended for connection to opposite sides of a power assistance ram) and a common return port E (intended for communication to reservoir). The ports in the wall 15a will interconnect and be controlled by the rotary valve in conventional manner. It will be predetermined that if the rotary valve is in its desired neutral condition, when fluid pressure is applied to the port S there will be resultant known or balanced pressures at the ports P1, P2 and E. Accordingly a predetermined fluid pressure is applied at port S (conveniently from an air line) and the resultant pressures at P1, P2 and E determined. If these latter pressures do not correspond to those which would be expected with the rotary valve in its neutral condition, it will be apparent that some adjustment is necessary in the relative positioning of the control ports between the sleeve and the rotor by effectively rotationally adjusting the sleeve 5 relative to the rotor 3 (and relative to the axial projection 11a bearing in mind that the engagement of the projection 11a with the sleeve 5 determines the neutral condition). Accordingly, to effect the aforementioned adjustment, the pressure exerted by the C-spring 24 and which frictionally secures that spring relative to the valve sleeve 5 is relieved by nipping together the ears 26 of the spring with an appropriate tool as previously discussed. The tool can conveniently be applied to the C-spring through an access opening 40 provided in the cylinder wall 15a. With the diameter of the C-spring 24 reduced, the spring 24 can be displaced circumferentially relative to the sleeve 5 (the latter being restrained from rotation by the pins 18) and within the extent of the cut-away region 32. During this circumferential displacement of the spring 24 relative to the sleeve 5, the end cap 15c and rotor 3 are also circumferentially displaced relative to the sleeve 5 (by the engagement of the projection 11a with the recess 27 in the spring 24 and the engagement of the pin 12 with the recess 22 in radial alignment with the projection 11a). As a consequence, the control ports between the valve sleeve and valve rotor are circumferentially adjusted until the control ports are positioned in the desired neutral condition of the rotary valve (as determined by observation of the pressures at the ports P1, P2 and E). With the valve so adjusted to its predetermined neutral condition, the restraint on the C-spring 24 is removed to allow that spring to expand under its natural resilience into frictional engagement with the recess 30; this effectively retains the spring 24 on the valve sleeve 5 with the recess 27 of the spring accurately located at a position in which it engages with the projection 11a (and will therefore engage with the axial projection 11 in the steering gear assembly of FIG. 1) with the valve and sleeve members in their desired neutral condition.

Having so adjusted the rotary valve, the rotor 3 and sleeve 5 are removed from the jig 15 without disturbing the relationship between the C-spring 24 and the valve sleeve. The C-spring 24 is now fixedly secured to the valve sleeve, conveniently by a laser welding technique or by adhesive bonding. Effectively the adjustment component provided by the C-spring 24 now becomes an integral part of the valve sleeve in which the recess 27 is to be coupled with the axial projection 11 of the steering gear in FIG. 1. Consequently when the sleeve and rotor of the valve assembly are incorporated in the power assisted steering gear shown in FIG. 1 with the projection 11 axially received in the recess 27 to provide the coupling between the pinion shaft 9 and the sleeve 5 (while the C-spring 13 biases the pin 12 and projection 11 into radial alignment) it will be known that the rotary valve is in its desired neutral condition.

The above described and illustrated embodiment utilises circumferential displacement of the position of the location for the coupling of the projection 11 relative to the valve sleeve for setting up the valve in its desired neutral condition. However, in a second embodiment the rotary valve can be set-up to its desired neutral condition by having an initially fixed coupling between the projection 11a and valve sleeve 5 in the jig and providing means whereby the pin 12 can, in effect, be circumferentially displaced relative to the rotor 3 and thereafter that pin fixedly secured to the rotor when the assembly has been adjusted to its desired neutral condition.

Such a second embodiment will now be described with reference to FIGS. 5 and 6 in which the pin 12 s carried by (preferably an integral part of) a C-spring 50 which encircles the rotor 3 and is received in an annular recess 51 in the rotor. The spring 50 is normally biased into frictional engagement with the rotor 3 in the recess 51 but can be displaced against its biasing to diametrically enlarge the spring by opening the mouth of the spring with an appropriate tool (not shown) applied to the opposed ends 50a of the spring—the aforementioned tool is conveniently applied through the opening 40 in the jig wall as previously discussed. By relieving pressure on the spring 50, the rotor 3 can be circumferentially displaced relative to the pin 12. In this second embodiment the projection 11a of the end cap 15c of the jig is received as a reasonably close sliding fit in a complementary recess 52 in the end face of the sleeve 5 so that the sleeve 5 is thereby restrained from rotation relative to the end cap 15c. In addition the jig walls 15a and 15b (not shown in FIG. 5) are restrained from rotation relative to the end cap 15c and the C-spring 50 is restrained from rotation relative to the end cap 15c (by engagement of the projection 12 closely within the confines of the opposed side walls 21 of the bracket 20 on the end cap of the jig). With pressure relieved on the spring 50 as previously mentioned, the rotor 3 can be circumferentially displaced relative to the pin 12 and to the sleeve 5 until the rotary valve is adjusted to its desired neutral condition as previously explained. In this latter condition the spring 50 is permitted to frictionally engage the rotor and the so adjusted rotor and sleeve are removed from the jig and the pin 12/spring 50 fixedly secured relative to the rotor 3, for example by locking screws, adhesive or welding, prior to the valve assembly being incorporated in the gear of FIG. 1.

Figure 7:
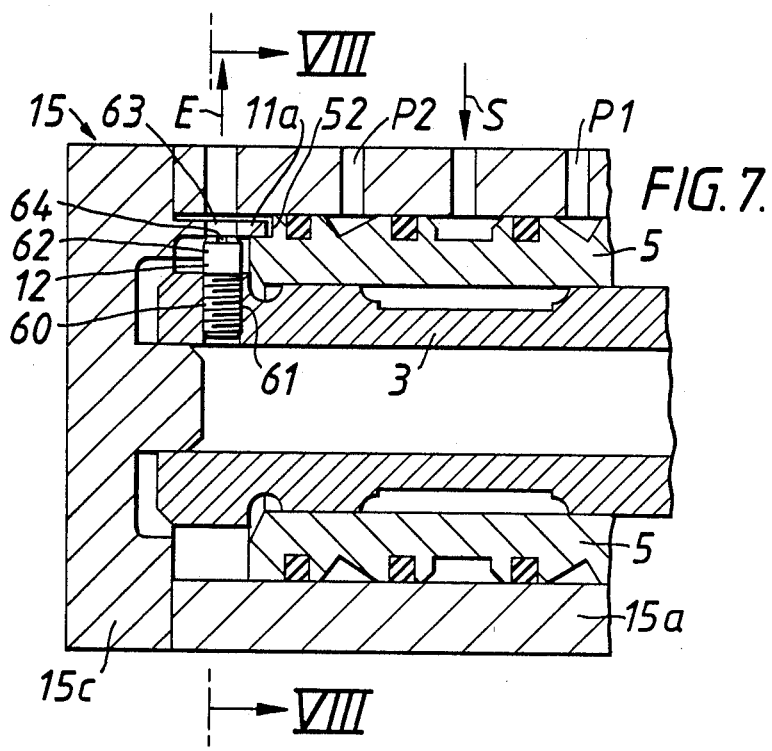
FIG. 7 is an axial section similar to that shown in FIG. 5 and shows a modification in which the adjustment component on the rotor member is an eccentric pin.
Figure 8:
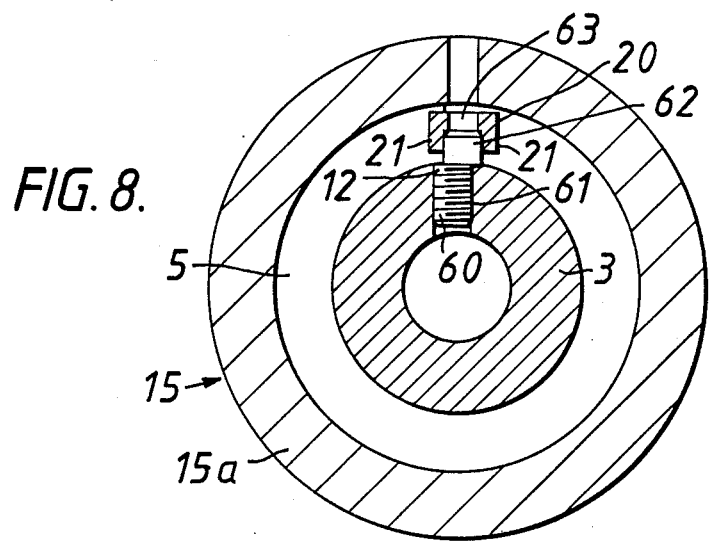
FIG. 8 is a section of the modification shown in FIG. 7 taken on the line VIII—VIII of that Figure.

In the arrangement shown in FIGS. 7 and 8 which may be regarded as a modification of the embodiment in FIGS. 5 and 6, the C-spring 50 and recess 51 are omitted from the rotor 3 and the pin 12 is screw threaded at 60 to engage within a radially extending screw threaded bore 61 in the rotor 3. The pin 12 has a radially extending cylindrical head 62 which is eccentric relative to its screw threaded part 60 and which is closely received within the confines of the opposed side walls 21 of the bracket 20 on the end cap of the jig. The pin 12 can be rotated within the screw threaded bore 61 by a suitable tool, such as a screw driver, which is conveniently inserted through the exhaust port E of the jig and an aperture 63 in the bracket 20 to engage in a slot 64 in the head part 62 of the pin. Upon rotation of the pin 12 it will be apparent that the consequential rotation of its eccentric head 62 within the confines of the bracket 20 will circumferentially adjust the location of the pin head 62 on the rotor 3 and thereby impart restricted rotation of the rotor 3 relative to the bracket 20 (and thereby relative to the projection 11a of the end cap 15c). Similarly to the embodiment of FIGS. 5 and 6, the projection 11a s a close fit within the recess 52 in the sleeve 5 so that the sleeve is thereby restrained from rotation relative to the end cap 15c. The rotation of the pin 12 within the jig will therefore rotate the rotor relative to the sleeve until the rotary valve is adjusted to its desired neutral condition; following such adjustment the rotor and sleeve are removed from the jig and the pin 12 secured to the rotor.

I claim:

1. A rotary valve assembly comprising:

a sleeve member;

a rotor member received within said sleeve member coaxial therewith, said rotor member being rotatable relative to said sleeve member about a common axis from a neutral condition of said rotary valve assembly to control flow of fluid therethrough;

a first C-shaped spring arranged about said common axis for biasing said sleeve and rotor members to said neutral condition;

first and second abutments connected, respectively, to said sleeve and rotor members for rotation therewith and engageable by said first C-shaped spring, respective predetermined circumferential positions in which said first and second abutments are connected to said sleeve and rotor members, determining a predetermined circumferential orientation of said sleeve and rotor members in said neutral condition; and at least one adjustment member which is adjustable relative to at least one of said sleeve and rotor members to an initially adjusted position and is thereafter secured to said one of said sleeve and rotor members in the initially adjusted position;

said adjustment member in the initially adjusted position connecting a respective one of said first and second abutments to the one of said sleeve and rotor members in a predetermined circumferential position relative to said one of said sleeve and rotor members for joint rotation of said one of said first and second abutments and said one of said sleeve and rotor members, said adjustment member comprising a spring member circumscribing said common axis and biased into frictional engagement with said one of said sleeve and rotor members prior to be moved to its initially adjusted position, and said spring member being displaceable relative to said one of said sleeve and rotor members against its biasing force to its initially adjusted position.

2. A rotary valve assembly as claimed in claim 1 wherein said spring member comprises a second C-shaped spring, and said one of said sleeve and rotor members has a recess for receiving said C-shaped spring therein.

3. A rotary valve assembly as claimed in claim 2 wherein said respective one of said first and second abutments comprises a projection and said second C-shaped spring comprises means for engaging said projection for rotation therewith.

4. A rotary valve assembly as claimed in claim 3 wherein said engaging means comprises surface means defining a recess for receiving said projection.

5. A rotary valve assembly as claimed in claim 4 wherein said C-shaped spring is secured to the one of said sleeve and rotor members by one of welding, bonding and adhesion.

6. A rotary valve assembly a claimed in claim 2 wherein said second C-shaped spring is secured to said rotor means, and said second abutment comprises a projection carried by said second C-spring.

7. A method of assembling a rotary valve assembly comprising a sleeve member, a rotor member received within the sleeve member for rotation relative thereto about a common axis, a first C-shaped spring circumscribing the common axis for biasing the sleeve and rotor members to a neutral condition of the rotary valve assembly, first and second abutments connected, respectively, to the sleeve and rotor members in respective predetermined circumferential positions with respect to the sleeve and rotor members and engageable by the first C-shaped spring, the respective predetermined circumferential positions in which the first and second abutments are connected to the sleeve and rotor members determining a predetermined circumferential orientation of the sleeve and rotor members in the neutral condition, and at least one adjustment member which is adjustable relative to at least one of the sleeve and rotor members to an initially adjusted position and is thereafter secured to the one of the sleeve and rotor members in the initially adjusted position to connect a respective one of the first and second abutments to the one of the sleeve and rotor members in a predetermined circumferential position for joint rotation of the one of the first and second abutments and the one of the sleeve and rotor members, said method comprising the steps of:

positioning the sleeve and rotor members having the adjustment member carried by one of the sleeve and rotor members into a jig housing;

determining the circumferential orientation of the sleeve and rotor members;

adjusting the position of the adjustment member on the one of the sleeve and rotor members if the circumferential orientation of the sleeve and rotor members does not correspond to the predetermined circumferential orientation of the sleeve and rotor members in the neutral position thereof to an initially adjusted position in which the adjustment member connects the respective one of the first and second abutments to the one of the sleeve and the rotor members in the predetermined circumferential position relative to the one of the sleeve and rotor members; and fixedly securing the adjustment member to the one of the sleeve and rotor members in the initially adjusted position of the adjustment member thereon.

8. A method as claimed in claim 7 wherein the step of determining the circumferential orientation of the sleeve and rotor members comprises the step of subjecting the sleeve and rotor members to fluid pressure to determine fluid pressure characteristics at ports of the jig housing, and the step of adjusting the position of the adjustment member comprises the step of adjusting the position of the adjustment member relative to the one of the sleeve and rotor members until the fluid pressure characteristics at the ports of the jig housing correspond to the fluid pressure characteristics of the rotary valve assembly in the predetermined circumferential orientation of the sleeve and rotor members.

9. A method as claimed in claim 7 wherein the adjustment member is a spring member carried by the one of the sleeve and rotor members, extending about the common axis, and biased into frictional engagement with the one of the sleeve and rotor members prior to being moved to its adjusted position, and the step of adjusting the position of the adjustment member comprises the step of displacing the spring member against its biasing force to its initially adjusted position on the one of the sleeve and rotor members.

10. A method as claimed in claim 9 wherein the spring member comprises a second C-shaped spring biased radially into frictional engagement with a circumferential recess in the one of the sleeve and rotor members, and the step of displacing comprises the step of displacing the second C-shaped spring in the circumferential recess of the one of the sleeve and rotor members.

11. A method as claimed in claim 7 wherein the respective one of the first and second abutments comprises a projection and the adjustment member comprises means for engaging the projection for rotation therewith, and the step of adjusting the position of the adjustment member comprises the step of moving the adjustment member to an initially adjusted position in which the engaging means occupies a position relative to the one of the sleeve and rotor members in which the engaging means engages the projection in the predetermined circumferential position of the respective one of the first and second abutments relative to the one of the sleeve and rotor members.

12. A method as claimed in claim 11 wherein the engaging means comprises surface means defining a recess on the adjustment member for receiving the projection, and the step of moving the adjustment member comprises the step of moving the adjustment member to an initially adjusted position in which the recess receives the projection in the predetermined circumferential position of the respective one of the first and second abutments relative to the one of the sleeve and rotor members.

13. A method as claimed in claim 12 further comprising the step of providing the jig housing with a projection that occupies a position relative to the one of the sleeve and rotor members when they are received in the jig housing corresponding to the predetermined position of the respective one of the first and second abutments relative to the one of the sleeve and rotor members.

14. A method as claimed in any one of claims 7 through 13 wherein the step of fixedly securing the adjustment member to the one of the sleeve and rotor members comprises the step of securing the adjustment member to the one of the sleeve and rotor members by one of welding, bonding, and adhesion.

15. A method as claimed in claim 10 wherein the second abutment comprises a radial projection carried by said second C-shaped spring, and the step of displacing the second C-shaped spring comprises the step of displacing the second C-shaped spring in the circumferential recess in the rotor member.

16. A method as claimed in claim 7 wherein the second abutment comprises a radially extending eccentric projection carried by the adjustment member, and the step of adjusting the position of the adjustment member comprises the step of adjusting the position of the adjustment member on the rotor member.

* * * * *

UNITED STATES PATENT AND TRADEMARK OFFICE
CERTIFICATE OF CORRECTION

PATENT NO. : 4,823,839

DATED : April 25, 1989

INVENTOR(S) : Alan Rayner

It is certified that error appears in the above-identified patent and that said Letters Patent is hereby corrected as shown below:

Column 9, Line 62, change "means" to --member--

Column 10, Line 34, after "and" delete --the--

Signed and Sealed this

Seventeenth Day of April, 1990

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,823,839

DATED : April 25, 1989

INVENTOR(S) : Alan Rayner

It is certified that error appears in the above-identified patent and that said Letters Patent is hereby corrected as shown below:

Column 9, Line 60, Claim 6, change "a" second occurence to --as--.

Signed and Sealed this

Twenty-sixth Day of February, 1991

Attest:

HARRY F. MANBECK, JR.

*Attesting Officer*  *Commissioner of Patents and Trademarks*